(12) United States Patent
Luo et al.

(10) Patent No.: US 10,282,449 B1
(45) Date of Patent: May 7, 2019

(54) MULTIPLE AGGREGATES IN A SINGLE USER-DEFINED FUNCTION

(71) Applicant: Teradata US, Inc., Dayton, OH (US)

(72) Inventors: Congnan Luo, San Diego, CA (US); Yu Long, San Diego, CA (US); Heng Yuan, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 399 days.

(21) Appl. No.: 14/835,768

(22) Filed: Aug. 26, 2015

Related U.S. Application Data

(60) Provisional application No. 62/099,011, filed on Dec. 31, 2014.

(51) Int. Cl.
*G06F 17/30* (2006.01)

(52) U.S. Cl.
CPC .. *G06F 17/30483* (2013.01); *G06F 17/30339* (2013.01)

(58) Field of Classification Search
CPC ................................................ G06F 17/0486
USPC ........................................ 707/645, 644, 718
See application file for complete search history.

(56) References Cited

U.S. PATENT DOCUMENTS

| | | | | |
|---|---|---|---|---|
| 2005/0177579 | A1* | 8/2005 | Blakeley | G06F 17/30412 |
| 2009/0070359 | A1* | 3/2009 | Nolan | G06F 17/30398 |
| 2012/0191699 | A1* | 7/2012 | George | G06F 17/30486 |
| | | | | 707/718 |

* cited by examiner

*Primary Examiner* — Baoquoc N To
(74) *Attorney, Agent, or Firm* — Randy L. Campbell, Jr.

(57) ABSTRACT

A data store system may include a persistent storage device that may store a plurality of data tables. The data store system may further include a processor array in communication with the persistent storage device. The processor array may receive a query comprising a call to a user-defined function (UDF) that may determine a plurality of aggregates for at least one data table from the plurality of data tables. The processor array may determine a number of the plurality of aggregates in the UDF. The processor array may perform a single read of rows associated with the plurality aggregates from the at least one data table. At least one row of the rows may be commonly associated with more than one of the plurality of aggregates. The processor array may generate each aggregate of the plurality of aggregates using the rows according to the UDF. A method and computer-readable medium may also be implemented.

19 Claims, 5 Drawing Sheets

MULTIPLE AGGREGATES IN A SINGLE USER-DEFINED FUNCTION

CLAIM OF PRIORITY

This application claims the benefit of priority under 35 U.S.C. 119(e) of U.S. Provisional Patent Application Ser. No. 62/099,011 filed on Dec. 31, 2014, which is hereby incorporated by reference in its entirety.

BACKGROUND

1. Technical Field

The present disclosure relates generally to user-defined functions, and more particularly to, multi-aggregate user-defined functions.

2. Related Art

A data store is a collection of stored data that is logically related and that is accessible by one or more users or applications. User-defined functions (UDFs) may be user-developed functions capable of operating on data store data. Currently database languages, such as Structured Query Language (SQL), only support user-defined aggregate functions with a single return value. However, in certain scenarios, multiple aggregate values may be desired. Limited by the single return values of a UDF, multiple aggregate functions would need to be written and executed one-by-one in a query. For example, if a user wants to query the maximum size, minimum size and average size of all the deals made by each of particular salespeople during a year, then a single value return query may include:

SELECT Sale_agent_id,
fmax(deal_size),
fmin(deal_size),
favg(deal_size)
FROM Sale_Record_Tbl
Group By Sale_agent_id
WHERE deal_time >=Date("2013-01-01") AND
deal_time <=Date("2013-12-31")

Thus, three separate aggregate functions, max( ), fmin( ), and favg( ), must be written to determine each aggregate. During the execution, for each of the rows qualified for the WHERE condition, the database has to execute the UDF three times, each for one of the three aggregate UDFs. As a result, if there are one million rows qualified, then three million UDF calls must be made. This hard limit of a single-return-value policy causes inconvenience for UDF development and also degrades the performance, especially if these UDFs are executed under the "protected mode" in which the execution of the UDFs is performed on a system outside of the data store system to protect the data store system from any errors associated with the UDF execution. There is a large resource overhead associated with transmitting each qualified row outside of the data store system. Thus, it would be beneficial to perform as single read of each row qualified for multiple aggregates in a query.

SUMMARY

According to one aspect of the disclosure, a data store system may include a persistent storage device that may store a plurality of data tables. The data store system may further include a processor array in communication with the persistent storage device. The processor array may receive a query comprising a call to a user-defined function (UDF) that may determine a plurality of aggregates for at least one data table from the plurality of data tables. The processor array may determine a number of the plurality of aggregates in the UDF. The processor array may perform a single read of rows associated with the plurality aggregates from the at least one data table. At least one row of the rows may be commonly associated with more than one of the plurality of aggregates. The processor array may generate each aggregate of the plurality of aggregates using the rows according to the UDF.

According to another aspect of the disclosure, a method of operating a data store system may include receiving a query comprising a call to a user-defined function (UDF) that may determine a plurality of aggregates for at least one data table from a plurality of data tables. The method may further include determining a number of the plurality of aggregates in the UDF. The method may further include performing a single read of rows associated with the plurality aggregates from the at least one data table. At least one row of the rows may be commonly associated with more than one of the plurality of aggregates. The method may further include generating each aggregate of the plurality of aggregates using the rows according to the UDF.

According to another aspect of the disclosure, a non-transitory computer-readable medium may be encoded with a plurality of instructions executable by a processor. The plurality of instructions may include instructions to receive a query comprising a call to a user-defined function (UDF) that may to determine a plurality of aggregates for at least one data table from a plurality of data tables. The plurality of instructions may further include instructions to determine a number of the plurality of aggregates in the UDF. The plurality of instructions may further include instructions to perform a single read of rows associated with the plurality aggregates from the at least one data table. At least one row of the rows is commonly associated with more than one of the plurality of aggregates. The plurality of instructions may further include instructions to generate each aggregate of the plurality of aggregates using the rows according to the UDF.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
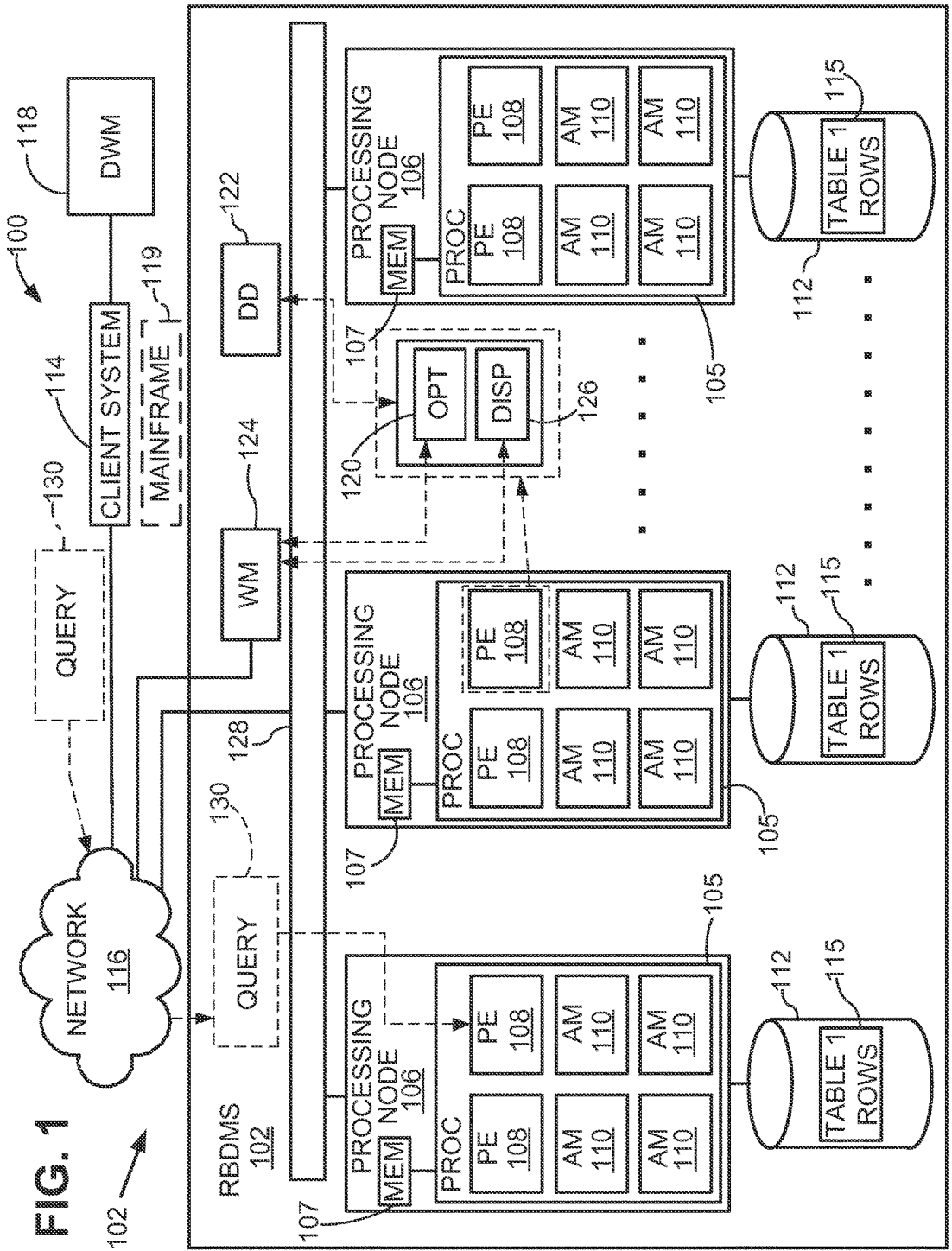
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, a module, such as the parsing engine modules 108 and access modules 110, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 107, for example, that comprises instructions executable with the processor 105 or other processor to implement one or more of the features of the module. When any one of the modules includes the portion of the memory that comprises instructions executable with the processor, the module(s) may or may not include the processor. In some examples, each module may just be the portion of the memory 107 or other physical memory that comprises instructions executable with the processor 105 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 105 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RDBMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RDBMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RDBMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RDBMS 102 as well as fields of each database, for example. Further, the data dictionary module 122 may specify the type, length, and/or other various characteristics of the stored tables. The RDBMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RDBMS 102 may include a workload management (WM) module 124, which in one example may be Teradata Active System Management. The WM module 124 may be implemented as a "closed-loop" system management (CLSM) architecture capable of satisfying a set of workload-specific goals. In other words, the RDBMS 102 is a goal-oriented workload management system capable of supporting complex workloads and capable of self-adjusting to various types of workloads. The WM module 124 may communicate with each optimizer module 120, as shown in FIG. 1, and is adapted to convey a confidence threshold parameter and associated parameters to the optimizer module 120 in communication. Further, the WM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the WM module 124 via the network 116.

The WM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the WM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
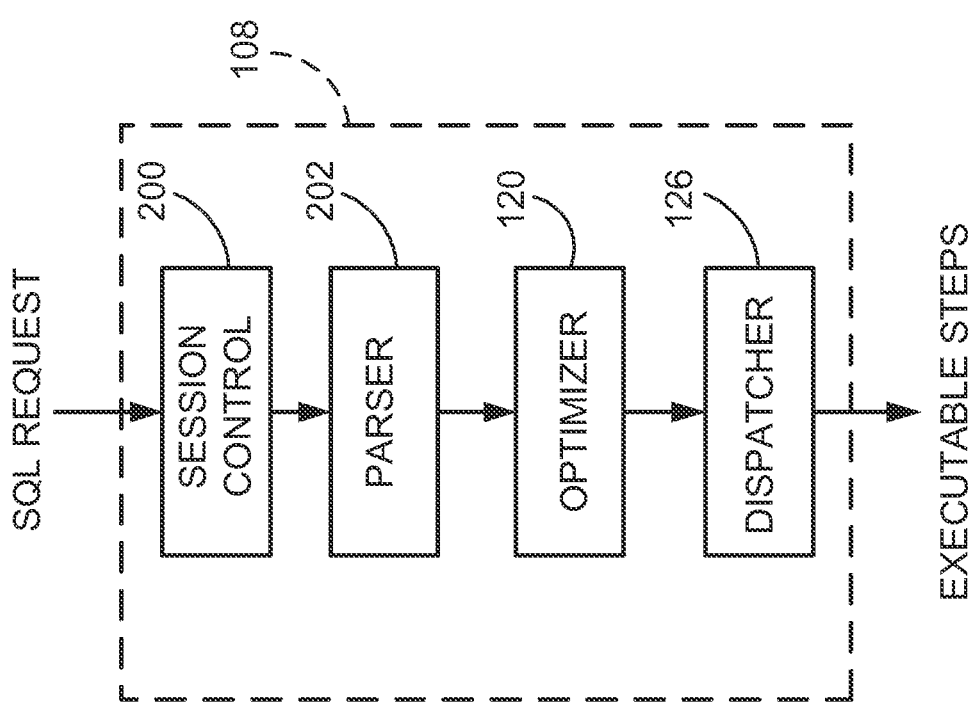
FIG. 2 is a block diagram of a portion of the example database system of FIG. 1.

In one example system, each parsing engine module 108 includes four primary components: a session control module 200, a parser module 202, the optimizer module 120 and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
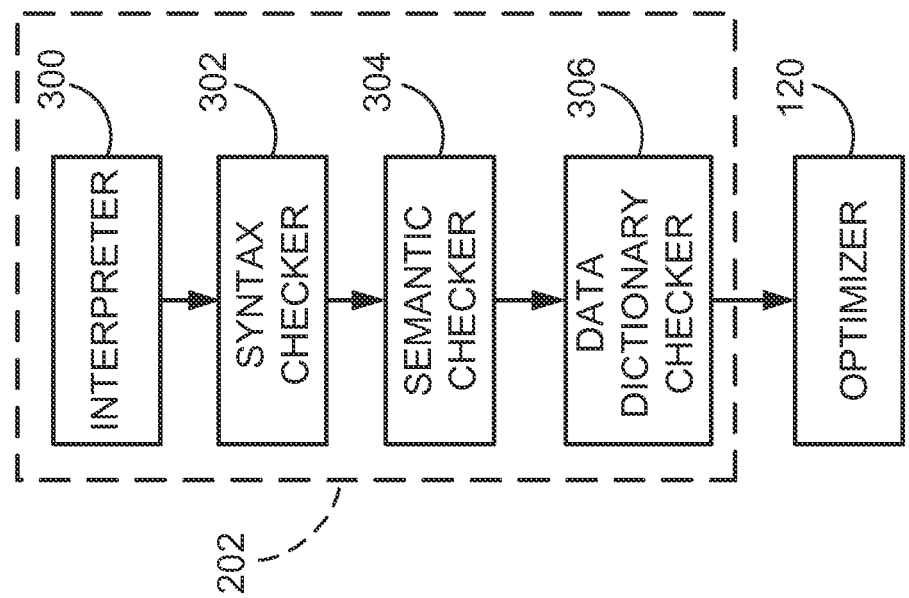
FIG. 3 is a block diagram of another portion of the example database system of FIG. 1.

As illustrated in FIG. 3, the parser module 202 may include an interpreter module 300 that interprets a database language request, such as a SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the WM 124 is configured to monitor runtime exception criteria. The WM 124 monitoring takes place by communicating with the dispatcher module 126 as it checks the query execution step responses from the access modules 110. The step responses include the actual cost information, which the dispatcher module 126 may then communicate to the WM 124 which, in turn, compares the actual cost information with the estimated costs of the optimizer module 120.

Figure 4:
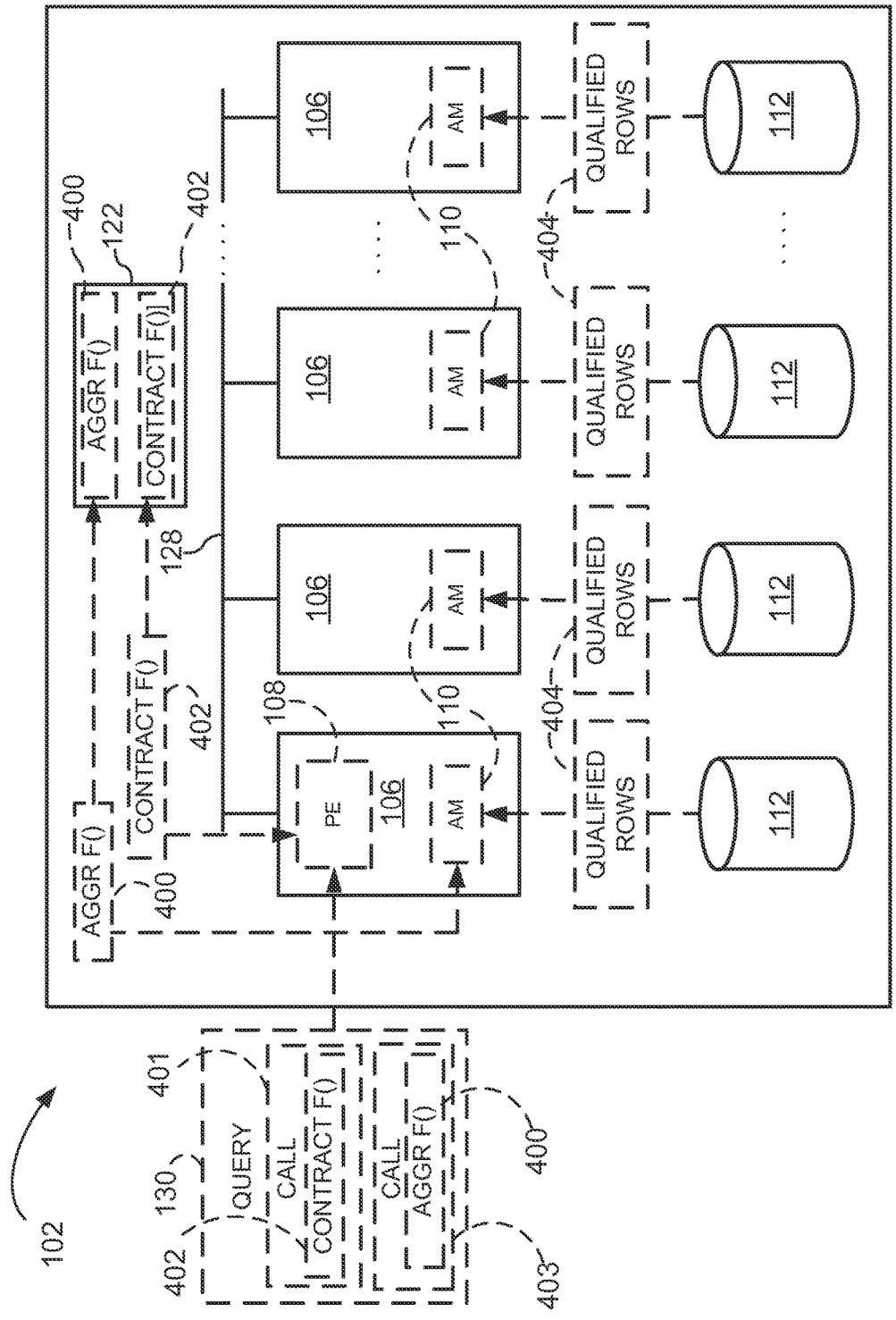
FIG. 4 is a block diagram of an example database system.

In one example, the RDBMS 102 may process a multiple-aggregate user-defined function (UDF) that determines multiple aggregates on common rows. In one example, the multiple-aggregate UDF may also use a contract function allowing the RDBMS 102 to determine the number of output columns resulting from the multiple-aggregate UDF. FIG. 4 is a block diagram of the RDBMS 102 during example processing of a multiple-aggregate UDF 400. The multi-aggregate UDF 400 may be received by the RDBMS 102 through a query 130. One of the processing nodes 106 may receive the query 130 and determine the contents via a parsing engine module 108, which may include a function call 401 to a contract function 402 (CONT F( )) that establishes the form of the query output, such as the number of output columns. The query 130 may also contain a function call 403 to the multi-aggregate UDF 400, which allows the multi-aggregate UDF 400 to be retrieved for execution. The multi-aggregate UDF 400 and the contract function 402 may be stored in the data dictionary 122.

In processing the multi-aggregate UDF 400, the parsing engine module 108 handling the query 130 may execute the contract function 402 to determine the form of the output of the multi-aggregate UDF 400. The multi-aggregate UDF 400 may be executed on the access modules 110 to identify the number of aggregate output values to be determined and retrieve the rows that qualify for the query, the qualified rows 404. The access modules 110 of each processing node 106 involved with the processing of the multi-aggregate UDF 400 may retrieve the qualified rows 404 from the DSFs 112 and process them according to the multi-aggregate UDF 400.

Figure 5:
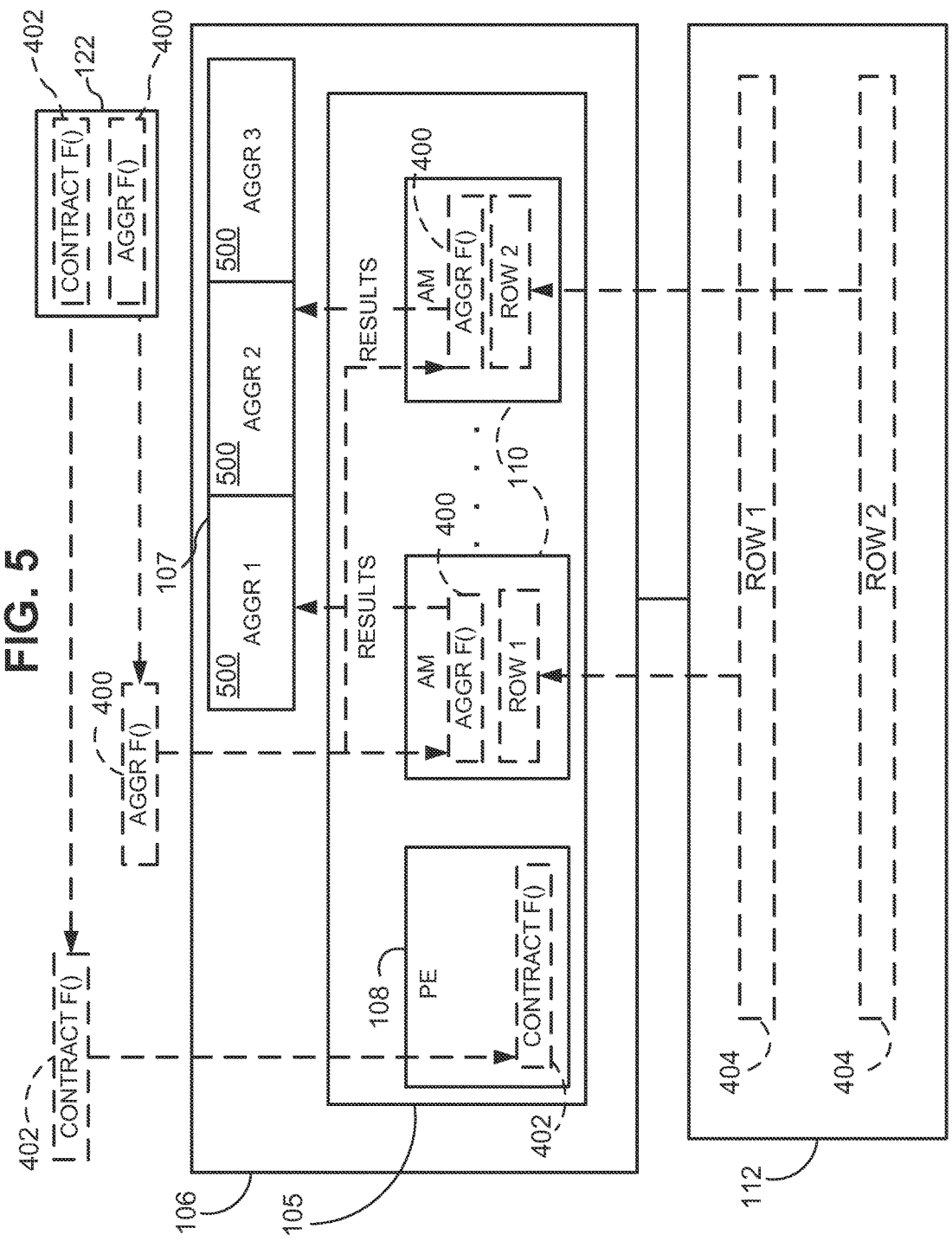
FIG. 5 is a block diagram of a portion of an example database system.

FIG. 5 is a block diagram of a processing node 106 during example processing of the multi-aggregate UDF 400. When the contract function 402 is processed by the parsing engine module 108, the parsing engine module 108 may communicate instructions to the access modules 110 involved with processing the multi-aggregate UDF 400 regarding the contract function 402, which directs the access modules 110 to process qualified rows for each output to be generated by execution of the multi-aggregate UDF 400. In one example, local memory 107 of each processing node 106 may be used by the access modules 110 of the processing node 106 as a cache to store local aggregate values for each output of the multi-aggregate UDF 400. For example, in FIG. 5 there are three different aggregates outputs to be determined by the multi-aggregate UDF 400, individually designated as AGGR 1, AGGR 2, and AGGR 3. In other examples, the multi-aggregate UDF 400 may generate additional or fewer aggregate outputs. Each output may have its own cache 500 in the local memory 107 of each processing node 106 having access modules 110 processing the multi-aggregate UDF 400.

Each access module 110 may process qualified rows assigned to each respective access module 110 involved in the multi-aggregate UDF 400. For example, in FIG. 5, one access module 110 retrieves the qualified row R1 from the DSFs 112 and another access module 110 retrieves the qualified row R2. Each access module 110 involved in executing the multi-aggregate UDF 400 may process associated qualified rows 404 in a similar fashion. Use of the local memories 107 in each processing node 106 allows an intermediate step to occur where intermediate results are spooled in the caches 500 of the memories 107 during a local phase of processing the multi-aggregate UDF 400. In such a configuration, the multi-aggregate UDF 400 allows a single read of each qualified row, which eliminates multiple reads of the same row used by single-value return UDFs. Any qualified rows to be used for more than one aggregate of the multi-aggregate UDF 400 may be replicated across the access modules 110. The single qualified row retrieval shown in FIG. 5 is for example purposes with most access modules 110 typically retrieving and processing multiple qualified rows.

Once the local processing is completed at the access modules 110, the access modules 110 may be instructed to process the cached intermediate values globally to generate the output columns of the multi-aggregate UDF 400. In such a scenario, the parsing engine module 108 may direct the access modules 110 to transfer to a global spool, which may be one of the designated caches 500 in one of the memories 107.

In one example, the parser 202 may be enhanced to accommodate the multi-aggregate UDF. In such an example, the parser 202 may call the contract function 402 to determine how many fields need to be placed in the SELECT list of the parser tree, and the data type, format, and title of each field. In addition, the instruction block that builds a response row may be enhanced to deal with multiple return values and to place all of the return values in the stack associated with the instruction block that builds a response row to finish the building of the response row.

In one example, a multi-input aggregate UDF 400 may be created using the following SQL syntax:
CREATE FUNCTION AGGR(deal_size FLOAT)
RETURNS VARYING USING FUNCTION AGGR_contract
CLASS AGGREGATE
LANGUAGE C
NO SQL
PARAMETER STYLE SQL
EXTERNAL;
This syntax creates the function AGGR and references the contract function "AGGR_contract". This syntax also allows the function AGGR to be called for determining multiple aggregates with a single function call and a single read of rows used across all aggregates. The "RETURNS VARYING USING FUNCTION AGGR_contract" defines that the function AGGR may return varying output through the use of AGGR_contract. The AGGR function may be called via the following SQL syntax:
SELECT Sale_agent_id, AGGR(deal_size)
USING Aggregate("fmax", "fmin", "favg")
FROM Sale_Record_Tbl
Group By Sale_agent_id
WHERE deal_time >=Date("2013-01-01") AND
deal_time <=Date("2013-12-31")
In this example, the AGGR function may be a multi-aggregate UDF that returns three aggregate values of a maximum, minimum, and average of a data set. In this example, the data set includes rows from the table "Sale_Record_Tbl". The SELECT statement selects the column Sale_agent_id of the table and calls the AGGR function with the column "deal_size" as input. The USING statement identifies the labeling tool "AGGREGATE" to assign titles to the output columns and may indicate the number of output columns that are desired to be produced and presented. In the example provided, all three output columns may be produced and generated through the terms expressed in the parentheses ("fmax", "fmin", "favg"). These terms indicate both the name to be given to each output column for display and that the output column for each is desired to be produced and displayed. In one example, if the term "NULL" is placed in any of the three positions, the RDBMS 102 will not produce and display an output column for that aggregate. In this manner, each time a multi-aggregate UDF 400 is called, the syntax may be used to select a subset of possible output columns that can be generated with the multi-aggregate UDF 400. The actual multi-aggregate UDF 400 may indicate the aggregates to be produced and the order of presentation. Thus, when calling the multi-aggregate UDF 400, the arrangement of output columns is fixed with respect to that displayed. In this example, all output columns are grouped by "Sale_agent_id".

Figure 6:
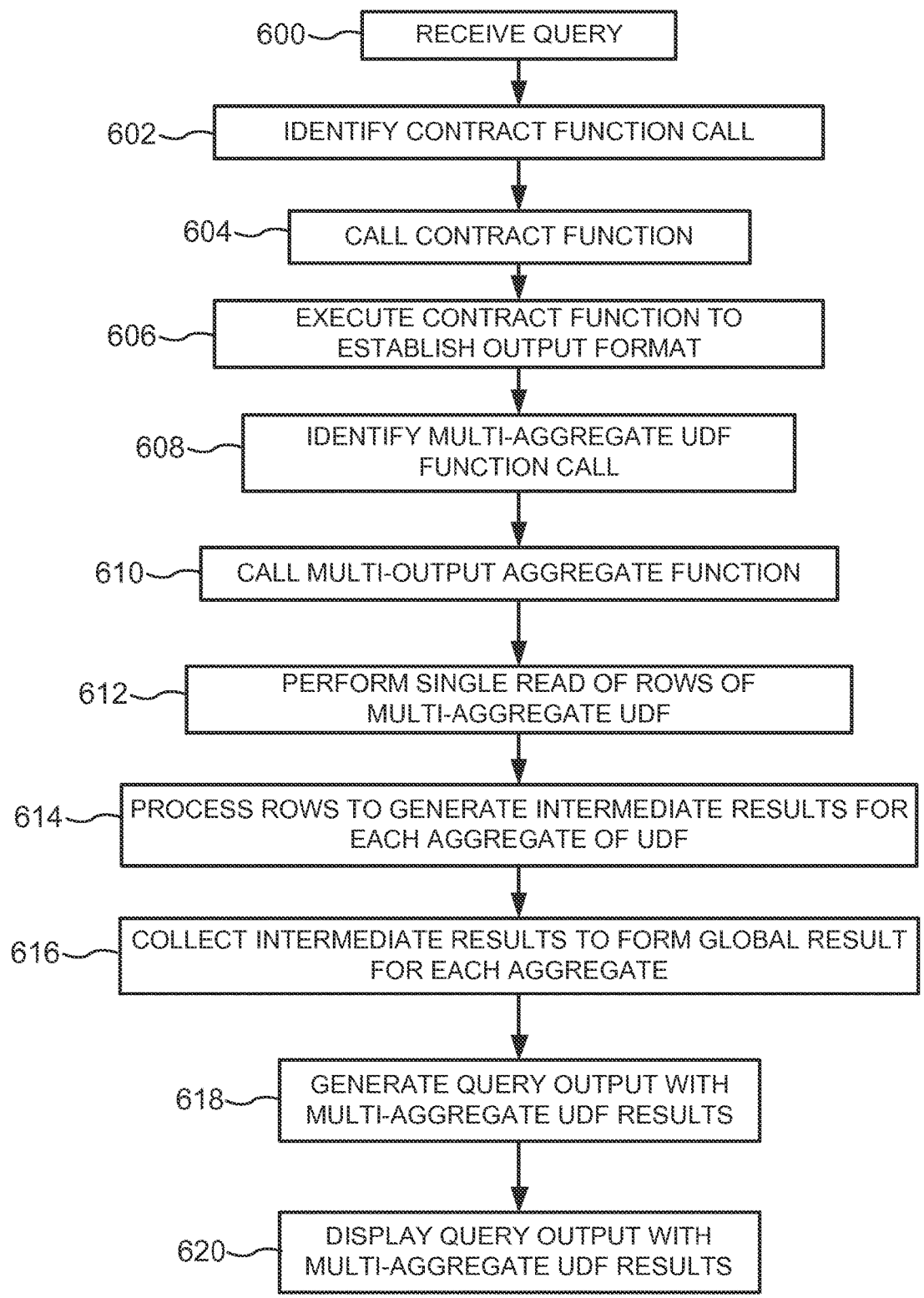
FIG. 6 is an operational flow diagram of example operation of a database system.

FIG. 6 is an operational flow diagram of example operation of the RDBMS 102 during execution of a multi-aggregate UDF. In one example, the RDBMS 102 may receive a query 130 (600). The RDBMS 102 may identify a function call 401 to the contract function 402 (602). A parsing engine module 108 may perform a function call 401 to the contract function 402 (604) and execute the contract function 402 to establish the output format of the multi-aggregate UDF 400 (606), which may indicate the number of output columns. The RDBMS 102 may identify a function call 403 to the multi-aggregate UDF 400 (608). In one example, the RDBMS 102 may use a parsing engine module 108 to perform the identification and to perform the function call 401 for the multi-output aggregate UDF 400 from the data dictionary 122 (610). The RDBMS 102 may perform a single read of the qualified rows associated with the multi-aggregate UDF 400 (612). Each qualified row of an input table of the multi-aggregate UDF 400 may be read by the access modules 110. The access modules 110 may perform a single read for each qualified row associated with the multi-output aggregate function 302 allowing each aggregate function to be performed on a common single qualified row that is read. In instances where qualified rows are associated with more than one aggregate of the multi-aggregate UDF 400, the qualified rows may be replicated by the access modules 110.

The qualified rows may be locally processed by the access modules 110 to generate intermediate results for each aggregate to be performed (614). In one example, the local memory 107 for each access module 110 may be used to separately spool the intermediate results of each aggregate function to be performed. The intermediate results may be collected for each aggregate function and used to create a global result for each aggregate function (616). The results of the function may be formatted and delivered as the query response (618), such as to the client system 114. The query results with the multi-output aggregate function results may be displayed (620), which may include multiple output columns generated by the multiple-aggregate UDF 400.

The examples herein have been provided with the context of a relational database system. However, all examples are applicable to various types of data stores, such as file systems or other data stores suitable for organization and processing of data. Moreover, additional or fewer operations of the operational flow diagrams may be implemented in some examples and the orders may be changed in some examples. While various embodiments of the invention have been described, it will be apparent to those of ordinary skill in the art that many more examples and implementations are possible within the scope of the invention. Accordingly, the invention is not to be restricted except in light of the attached claims and their equivalents.

We claim:

1. A data store system comprising:
a persistent storage device configured to store a plurality of data tables;
a processor array in communication with the persistent storage device, the processor array configured to:
receive a query, wherein the query comprises a call to a user-defined function (UDF), wherein the UDF is configured to determine a plurality of aggregates for at least one data table from the plurality of data tables during a single execution of the UDF;
determine a number of the plurality of aggregates to be determined in the UDF;
perform a single read of a plurality of rows associated with the plurality aggregates from the at least one data table, wherein at least one row of the plurality of rows is commonly associated with more than one of the plurality of aggregates; and
execute the UDF using the plurality of rows to generate each aggregate of the plurality of aggregates.

2. The data store system of claim 1, wherein the query further comprises a second call to a setup function configured to indicate the number of outputs of the UDF, wherein the array of processors is further configured to generate the plurality of aggregates according the setup function.

3. The data store system of claim 1, wherein the processor array is further configured to replicate each row read from the single read of the plurality rows that is commonly associated with one more of the plurality of aggregates.

4. The data store system of claim 1 further comprising a plurality of memory devices, wherein the processor array is further executable to store intermediate results for each aggregate in the plurality of memory devices.

5. The data store system of claim 4, wherein each memory device comprises a plurality of caches, wherein each cache is configured to store an intermediate result of a respective one of the plurality of aggregates.

6. The data store system of claim 4, wherein the processor array is further configured to collect the intermediate results into a final result for each aggregate.

7. The data store system of claim 1, wherein the UDF is configured to determine a number of aggregates, wherein the query is configured to indicate a number of aggregates to be determined with the UDF that is less than a total number of aggregates configured to be determined with the UDF, wherein the processor array is further configured to generate the number of aggregates indicated in the query.

8. A method of operating a data store system comprising:
receiving a query comprising a call to a user-defined function (UDF), wherein the UDF is configured to determine a plurality of aggregates for at least one data table from a plurality of data tables during a single execution of the UDF;
determining a number of the plurality of aggregates to be determined in the UDF;
performing a single read of a plurality of rows associated with the plurality aggregates from the at least one data table, wherein at least one row of the plurality of rows is commonly associated with more than one of the plurality of aggregates; and
executing the UDF using the plurality of rows to generate each aggregate of the plurality of aggregates.

9. The method of claim 8, wherein the query further comprises a second call to a setup function configured to indicate the number of outputs of the UDF, wherein the method further comprises generating the plurality of aggregates according the setup function.

10. The method of claim 8 further comprising replicating each row read from the single read of the plurality of rows that is involved with two or more of the plurality of aggregates.

11. The method of claim 8 further comprising storing intermediate results for each aggregate.

12. The method of claim 11, further comprising collecting the intermediate results into a final result for each aggregate.

13. The method of claim 8, wherein the UDF is configured to determine a number of aggregates, wherein the query is configured to indicate a number of aggregates to be determined with the UDF that is less than a total number of aggregates configured to be determined with the UDF, wherein the method further comprises generating the number of aggregates indicated in the query.

14. A non-transitory computer-readable medium encoded with a plurality of instructions executable by a processor, the plurality of instructions comprising:
instructions to receive a query, wherein the query comprises a call to a user-defined function (UDF), wherein the UDF is configured to determine a plurality of aggregates for at least one data table from a plurality of data tables;
instructions to determine a number of the plurality of aggregates to be determined in the UDF;
instructions to perform a single read of a plurality rows associated with the plurality aggregates from the at least one data table, wherein at least one row of the plurality of rows is commonly associated with more than one of the plurality of aggregates; and instructions to execute the UDF using the plurality of rows to generate each aggregate of the plurality of aggregates.

15. The non-transitory computer-readable medium of claim 14, wherein the query further comprises a second call to a setup function configured to indicate the number of outputs of the UDF, wherein the plurality of instructions further comprises instructions to generate the plurality of aggregates according the setup function.

16. The non-transitory computer-readable medium of claim 14, wherein the plurality of instructions further comprises instructions to replicate each row read from the single read of the plurality rows that is involved with two or more of the plurality of aggregates.

17. The non-transitory computer-readable medium of claim 14, wherein the plurality of instructions further comprises instructions to store intermediate results for each aggregate.

18. The non-transitory computer-readable medium of claim 17, wherein the plurality of instructions further comprises instructions to collect the intermediate results into a final result for each aggregate.

19. The non-transitory computer-readable medium of claim 14, wherein the UDF is configured to determine a number of aggregates, wherein the query is configured to indicate a number of aggregates to be determined with the UDF that is less than a total number of aggregates configured to be determined with the UDF, wherein the plurality of instructions further comprises instructions to generate the number of aggregates indicated in the query.

* * * * *